(12) United States Patent  (10) Patent No.: US 7,499,246 B2
Nakagawa  (45) Date of Patent: Mar. 3, 2009

(54) MAGNETIC HEAD DEVICE

(75) Inventor: Masayoshi Nakagawa, Tokyo (JP)

(73) Assignee: TDK Corporation, Tokyo (JP)

( * ) Notice: Subject to any disclaimer, the term of this patent is extended or adjusted under 35 U.S.C. 154(b) by 684 days.

(21) Appl. No.: 11/138,523

(22) Filed: May 26, 2005

(65) Prior Publication Data
US 2005/0270701 A1 Dec. 8, 2005

(30) Foreign Application Priority Data
Jun. 2, 2004 (JP) ............................. 2004-163950

(51) Int. Cl.
G11B 15/64 (2006.01)
(52) U.S. Cl. .................................. 360/294.4
(58) Field of Classification Search ............... 360/294.4
See application file for complete search history.

(56) References Cited
U.S. PATENT DOCUMENTS
6,282,063 B1 * 8/2001 Coon ..................... 360/245.3
6,751,069 B2 * 6/2004 Yao et al. ................. 360/294.4
7,184,245 B2 * 2/2007 Kasajima et al. ......... 360/294.4

FOREIGN PATENT DOCUMENTS
JP 2002-026411 1/2002
JP 2003-203319 7/2003

OTHER PUBLICATIONS
Office Action for corresponding Japanese Patent Application Serial No. 2004/163950 dated Jun. 12, 2007.
* cited by examiner Primary Examiner—Allen T Cao
(74) Attorney, Agent, or Firm—Brinks Hofer Gilson & Lione

(57) ABSTRACT

Recessed grooves having planar adhesion surfaces and inclined surfaces over the entire thickness of a slider, the inclined having a surface width equal to an adhered portion width at an arm of a microactuator, and form an angle with respect to the horizontal plane. The slider and the actuator are joined with an adhesive disposed between the slider and the adhered portion of the microactuator arm.

19 Claims, 12 Drawing Sheets

MAGNETIC HEAD DEVICE

This application claims the benefit of priority to Japanese Patent Application 2004-163950, which was filed on Jun. 2, 2004, and which is incorporated herein by reference.

TECHNICAL FIELD

The present application relates to a magnetic head device, and more particularly, to a magnetic head device which can be adhered to an actuator.

BACKGROUND

In recent years, with the enhancement of recording density of recording media, various methods have been employed in order to accurately perform servo tracking of elements which reproduce information signals recorded on recording tracks of recording media and of recording elements which write information signals on the recording tracks. As one of those methods, Japanese Unexamined Patent Application Publication No. 2003-203319 discloses a magnetic head device including a micro actuator.

In the magnetic head device disclosed in the reference, the slider is attached to and held by a microactuator having arms which can be deformed by a piezoelectric structure. The slider is moved on by the deformation of the micro actuator to enable accurate tracking of the reproducing and recording elements.

FIG. 7A and FIG. 8B, of the reference show a slider cut out to form a predetermined shape of recessed portions (recessed regions or steps) and an adhesive is then interposed between the recessed portions and the arms of the actuators (piezoelectric PZT beams 708) so that the slider is attached to the actuator.

However, the recessed regions (702) are formed at positions away from a front edge of the slider by a predetermined distance. Thus, the recessed regions are small and spaces defined when the slider is adhered to the micro actuator are small. Therefore, the amount of the adhesive entering the recessed regions is small and the adhesive force is weak. As a result, during the operation of a drive for the magnetic recording medium, the slider can slip out of the actuator.

Further, in the slider disclosed in FIG. 8B of the reference, recessed regions (810) are not formed over the entire height of the slider. Thus, the spaces defined when the slider is adhered to the micro actuator are small. Therefore, the amount of the adhesive entering the recessed regions is small and the adhesive force is weak. As a result, during the operation of a drive for the magnetic recording medium, the slider can slip out of the actuator. In the slider shown in FIG. 8B of the reference, when an adhesive is interposed, the adhesive can flow over the recessed regions and enter a rear edge side of the slider because the recessed regions are not formed over the entire length of the slider. When the adhesive flows over the recessed regions and enters the rear edge of the slider, the fixed regions in which the arms are fixed to the slider by an adhesive are lengthened. In the fixed regions of the arms, the arms are difficult deform because the arms are fixed to the slider by the adhesive. Accordingly, if the fixed regions of the arms are lengthened, the deformable regions of the arms are shortened. Therefore, a satisfactory moving distance of the slider fixed to the arms cannot be obtained, which makes it difficult to perform accurate position adjustment of the magnetic head. Further, variability in entering positions of an adhesive can occur depending on the dimensions of the respective magnetic head devices, and variability in the dimensions deformable regions of the arms occurs depending on respective magnetic heads. As a result, variability in the moving distances of a slider can occur.

Also, the steps (710) that function as recessed portions to which the arms of the micro actuator are fixed are continuously formed from the front edge of the slider to the rear edge of the slider. Thus, when an adhesive is interposed, the adhesive is apt to flow toward the rear edge side of the slider, and the fixed regions of the arms are apt to be lengthened, which makes it difficult to perform accurate position adjustment of the magnetic head. Further, since variability in entering positions of an adhesive occurs depending on respective magnetic head devices, variability in the moving distances of a slider also occurs.

SUMMARY

A magnetic head device which can be firmly adhered to an actuator and can prevent overflow of an adhesive used for adhesion is described.

A magnetic head device includes a slider provided with an element having at least one of a reproducing element which detects a signal recorded on a recording medium and a recording element which records a magnetic signal on the recording medium, the element being provided on a side of the slider facing the recording medium, and an actuator for moving the slider. Side surfaces of the slider have recessed portions formed from an upper surface of the slider to a lower surface of the slider, and the recessed portions are formed from a front edge of the slider to a rear end surface formed at a rear edge side thereof. The actuator has a base having a predetermined length, and deformable arms extending from the base and located on sides of the recessed portions. The arms and the recessed portions are bonded together with bonding means, and rear end surfaces of the bonding means are formed while abutting the rear end surfaces of the recessed portions. The bonding means may be any form of adhesive.

In an aspect, the recessed portions are continuously formed over the entire thickness of the slider from the front edge of the slider to the rear end surface of the slider. Therefore, the bonding means can be positively filled between the arms and the recessed portions, and the amount of the bonding means to be filled can be increased to reliably perform the bonding. Further, the bonding means can be prevented from overflowing to the air bearing surface (ABS). Moreover, the bonding means can be positively stopped by the rear end surfaces of the recessed portions to positively prevent the bonding means from overflowing to the free regions.

In another aspect a magnetic head device is provided, including: a slider provided with an element including at least one of a reproducing element which detects a signal recorded on a recording medium and a recording element which records a magnetic signal on the recording medium, the element being provided on a side of the slider facing the recording medium, and an actuator for moving the slider. Side surfaces of the slider have recessed portions formed from an upper surface of the slider to a lower surface thereof, and the recessed portions are formed from a rear edge of the slider to a front end surface formed at a front edge side of the slider. The actuator has a base having a predetermined length, and deformable arms extending from the base and located on sides of the recessed portions. The arms and the slider are bonded together with bonding means, and rear end surfaces of the bonding means are formed to cover the front end surfaces of the recessed portions.

Thus, the bonding means can be positively stopped while covering the front end surfaces of the recessed portions to minimize overflowing of the bonding means to the free regions.

Further, the front end surfaces or the rear end surfaces of the recessed portions may be formed with inclined surfaces having an angle θk with respect to a horizontal plane, and edges of the recessed portions, which are located on the recording medium facing side, are shorter than lengths of the edges that are located on the opposite side from the recording medium facing side.

Should the bonding means overflow, the bonding means easily flows to the opposite surface to the ABS surface, but the bonding means hardly flows to the ABS surface.

Further, the arms may be formed with deformable free regions, and fixed regions which are bonded to the slider via the bonding means, and the bonding means are formed in the fixed regions.

Thus, the free regions can have an appropriate length, and a desired moving distance of the slider can be obtained.

Further, the side surfaces of the arms may be formed with piezoelectric structures having piezoelectric elements, and the arms deformed by deformation of the piezoelectric structures.

Thus, the slider can be moved with the deformation of the arm, and the reproducing element and/or the recording element provided in the slider is able to scan a recording track of a recording medium by the movement of the slider.

The magnetic head device can be firmly adhered to an actuator, and overflow of an adhesive used for adhesion may be prevented.

DETAILED DESCRIPTION

Exemplary embodiments may be better understood with reference to the drawings, but these examples are not intended to be of a limiting nature. Like numbered elements in the same or different drawings perform equivalent functions.

Figure 1:
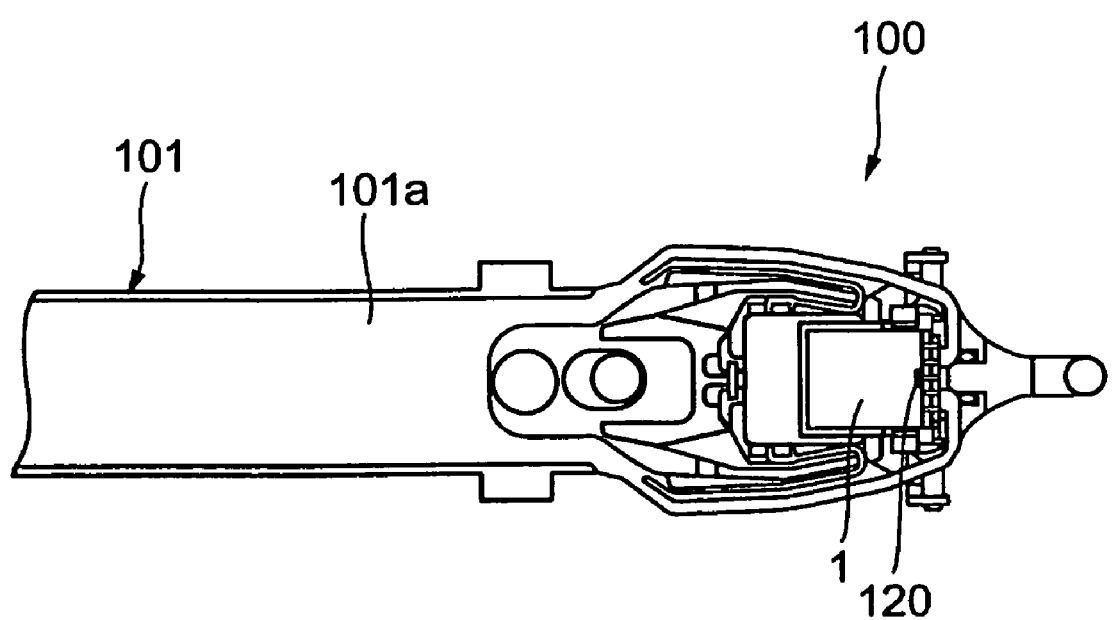
FIG. 1 is a plan view of a magnetic head device according to a first embodiment, as seen from a recording medium facing side.

FIG. 1 is a plan view of a magnetic head device according to a first embodiment, as seen from the recording medium facing side.

A magnetic head device 100 shown in FIG. 1 is constructed such that a tip of a lower surface 101a of a suspension 101 on a recording medium facing side is provided with an element 120 composed of a reproducing element which detects a magnetic signal recorded on a recording medium by, for example, a magnetic resistance effect, etc. and a recording element which records a magnetic signal on the recording medium. In addition, the element 120 may be composed of only either the reproducing element or recording element.

The element 120 is formed on a lower surface 1d (see FIG. 3) of a slider 1, and the lower surface 1d becomes a recording medium facing surface (ABS surface).

The suspension 101 is formed of a leaf spring member made of a conductive thin metallic material, such as stainless steel.

The slider 1 is bonded to a substantially U-shaped micro actuator 3 (FIG. 5) made of a ceramic material by means of adhesion, such as epoxy or other adhesive.

Figure 2:
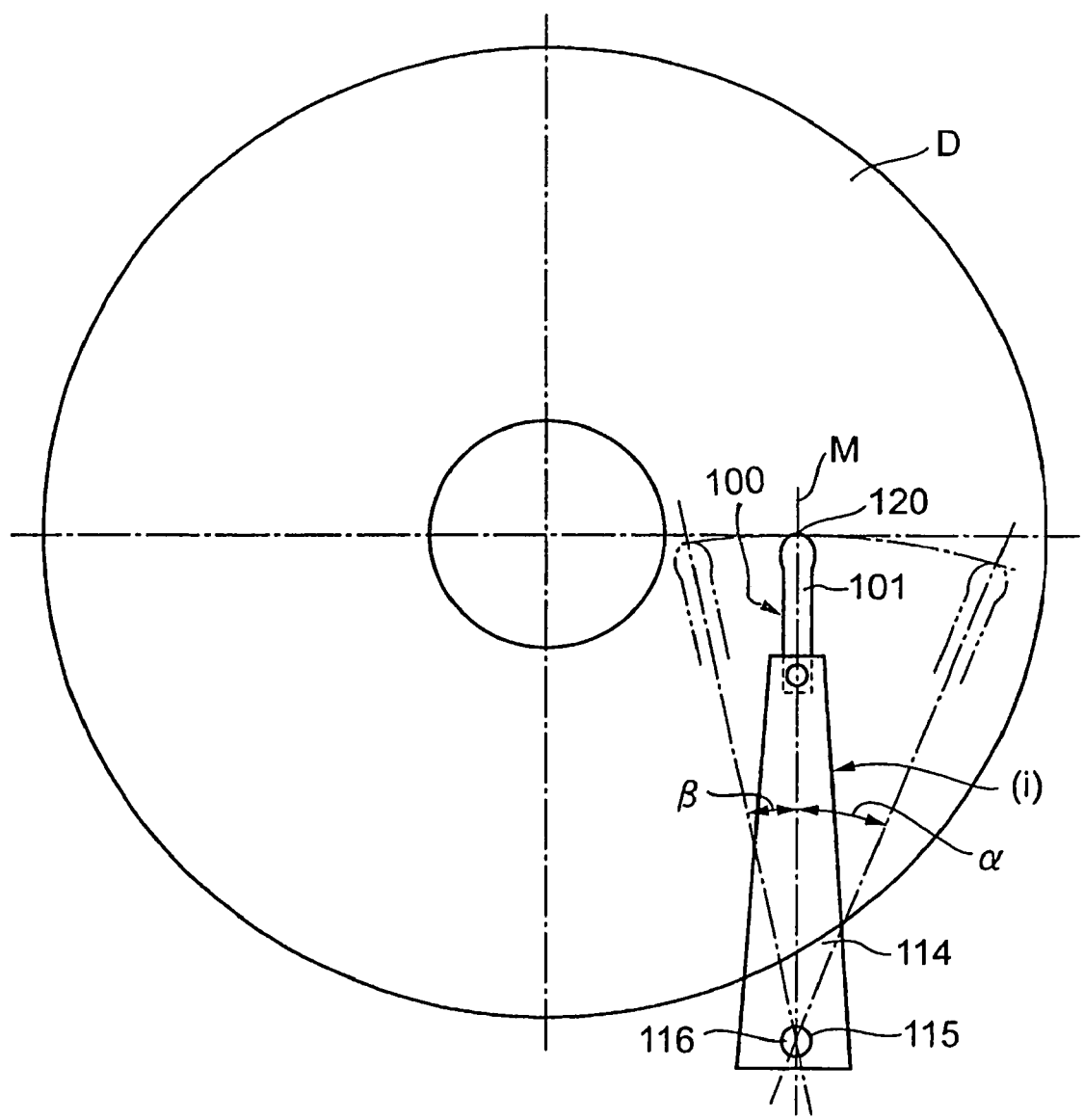
FIG. 2 is a plan view showing the operation of the magnetic head device according on a recording medium, as seen from an opposite side to the recording medium facing side.

As shown in FIG. 2, in the magnetic head device 100, the element 120 provided on a trailing end surface of the slider 1 faces an information recording surface of a recording medium, such as a hard disk D, and the slider 1 takes a floating posture under the influence of the air flow on the surface of the hard disk D which is generated when the hard disk D rotates.

The suspension 101 is fixed to a tip of a swing arm 114. A base support 115 of the swing arm 114 is rotatably supported by a supporting shaft 116, and the swing arm 114 is swung by a driving means which is not shown.

If the direction that magnetic poles face each other in the recording element of the element 120 is defined as an operation reference line M, a reference position (i) of the swing arm 114 when the operation reference line M is directed to a tangential direction of an actual recording track is indicated by a solid outline. As the swing arm 114 rotates by an angle α in the clockwise direction or an angle β in the counterclockwise direction from the reference posture (i), the element 120 scans the recording track of the hard disk D to reproduce and write information data.

Figure 3:
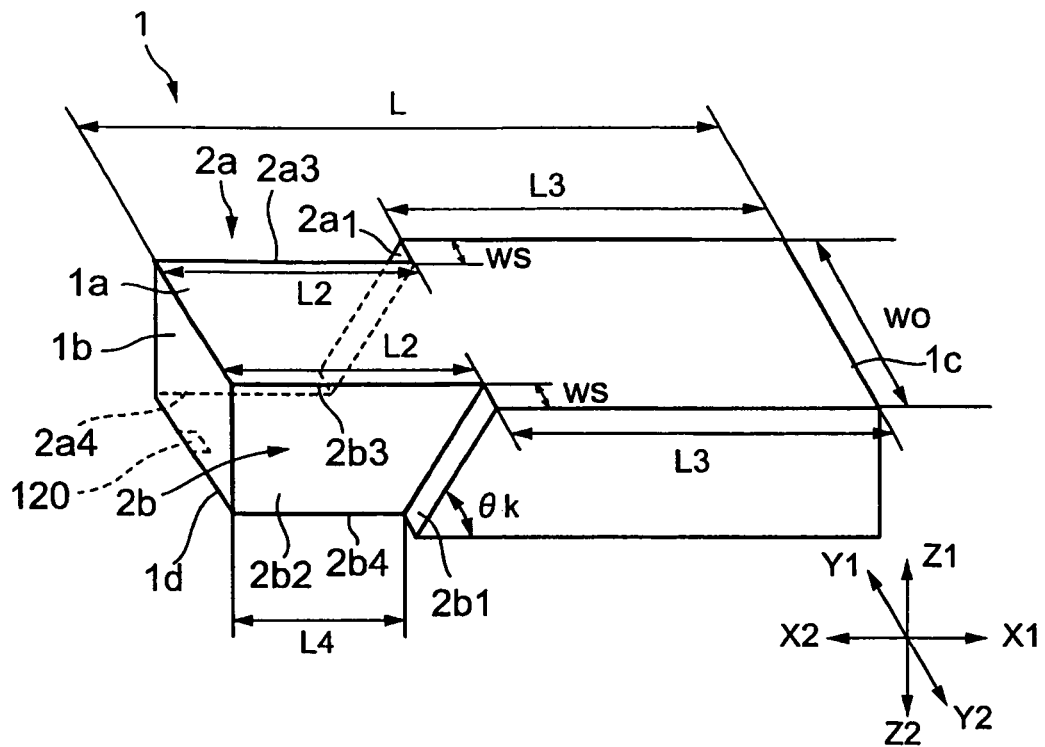
FIG. 3 is a perspective view showing a slider according to a first embodiment.
Figure 4:
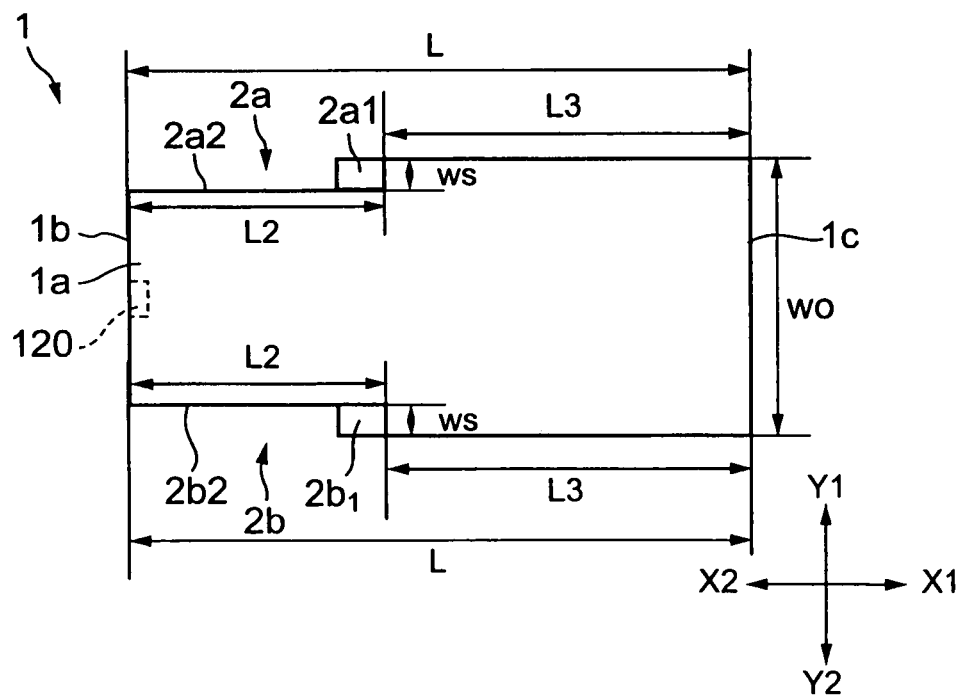
FIG. 4 is a plan view of the slider shown in FIG. 3.

FIG. 3 is a perspective view of the slider according to the first embodiment, and FIG. 4 is a plan view of the slider shown in FIG. 3.

As shown in FIG. 3, adhered portions 2a and 2b are provided on both the right and left (Y1-Y2 direction) sides of the slider 1 so as to extend by predetermined distances L2 and L4 from a front edge 1b of the slider 1 toward a rear edge 1c located in a longitudinal direction (X1-X2 direction).

The adhered portion 2b provided on the Y2-side is shaved off by an adhered portion width WS in the Y1 direction from an upper surface 1a of the slider 1 to a lower surface 1d thereof, i.e., over the entire thickness (Z1-Z2 direction) of the slider the adhered portion 2b defines a recessed portion having an inclined surface 2b1 which has a width equal to the adhered portion width WS at a base 32 (X1 direction) (FIG. 5) of the micro actuator and which forms an acute angle θk with respect to the horizontal plane and a planar adhesion surface 2b2. The adhered portion 2a provided at the Y1-side has the same structure as the adhered portion 2b, and defines a recessed groove having an inclined surface 2a1 which forms an acute angle θk with respect to the horizontal plane, and a planar adhesion surface 2a2. The inclined surfaces 2a1 and 2b1 become rear-end surfaces of the adhered portions 2a and 2b of the recessed portions.

It may be preferable that the angle θk be in a range of 45 to 90°. If the angle θk is in a range of 45 to 90°, an adhesive 4 may be inhibited from overflowing to the surface.

Figure 5:
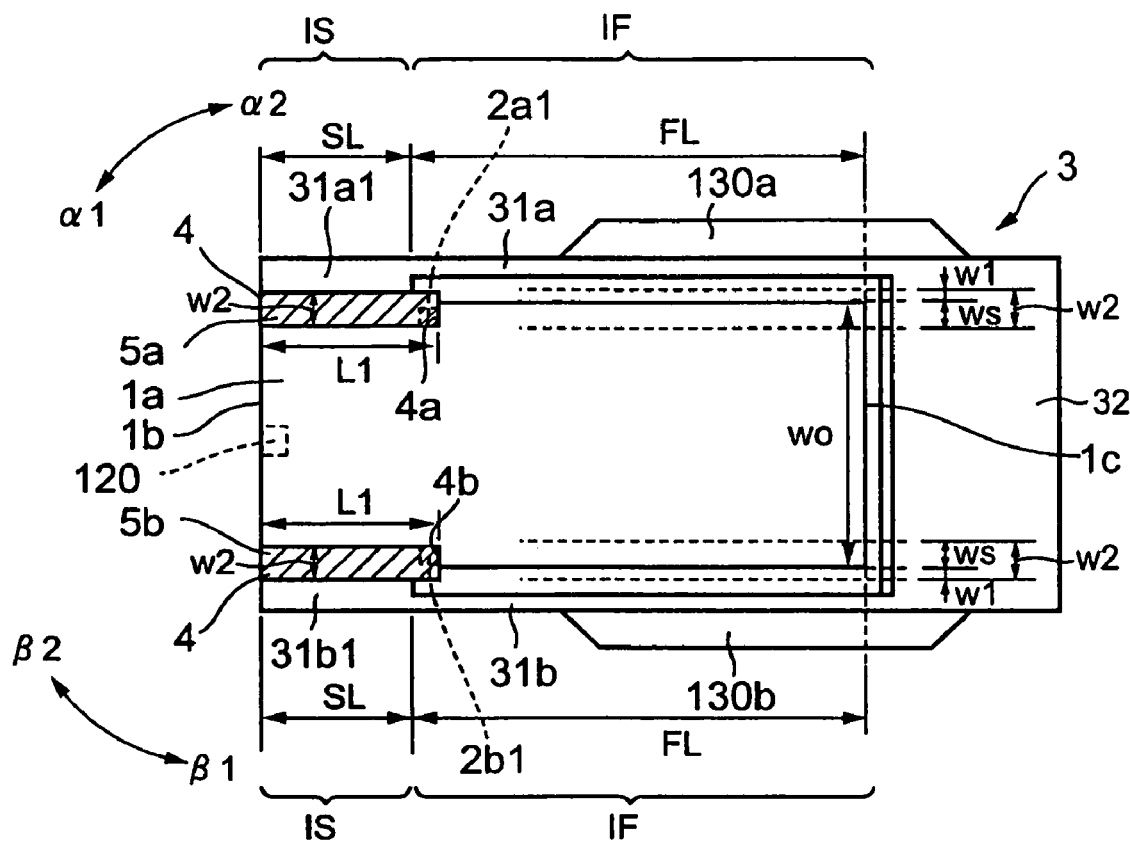
FIG. 5 shows a state in which the slider according to the first embodiment is bonded to a micro actuator.

As shown in FIG. 5, the actuator 3 has two arms 31a and 31b which extend from opposite side ends of the base 32. Inwardly projected portions 31a1 and 31b1 are formed in tip regions of the arms 31a and 31b.

The slider 1 is bonded to the micro actuator 3 with the adhesive 4 as a bonding means in a state in which the slider 1 is located between the arms 31a and 31b of the actuator 3 and the adhered portions 2a and 2b of the slider 1 face the projected portions 31a1 and 31b1 of the microactuator 3. An epoxy resin adhesive or other suitable adhesive material can be used as the adhesive 4. The adhesive 4 is filled into spaces 5a and 5b which are formed between the arms 31a and 31b and the adhered portions 2a and 2b by the capillary phenomenon.

Piezoelectric (PZT) structures 130a and 130b, which are made of lead zirconate titanate or the like, a known piezoelectric material, are bonded to side surfaces of the base 32 and arms 31a and 31b of the actuator 3. The PZT structures 130a and 130b have an anisotropic structure. When potentials having opposite polarities are simultaneously applied across the polarized piezoelectric elements, one surface of the PZT structures 130a and 130b expands and simultaneously the other surface thereof contracts. This expansion and contraction deforms the arm 31a bonded to the PZT structure 130a in the α1 direction and deforms the arm 31b bonded to the PZT structure 130b in a β1 direction equal to the deflection of the arm 31a. With a reversal of the polarity of the applied voltage, the arm 31a is deformed in a α2 direction, and the arm 31b is deformed in a β2 direction a deflection equal to the deflection of the arm 31a.

Since the slider 1 is bonded to the arms 31a and 31b of the micro actuator 3 and the projected portions 31a1 and 31b1 are constructed as fixed ends, when the arms 31a and 31b are deformed in the α2 and β2 directions, the slider 1 bonded between the arms 31a and 31b are moved in a direction substantially parallel to its widthwise direction (Y1-Y2 direction).

In the magnetic head device 100, the micro actuator 3 moves the slider 1 in the direction substantially parallel to the widthwise direction so that the servo tracking when the element 120 is caused to scan the recording track of the recording medium D can be performed with a high degree of accuracy.

The moving distance of such parallel movement is proportional to a free region dimension FL of a free region 1F shown in FIG. 5. Here, the free region 1F means a length (a length in the X1-X2 direction) of the free region 1F excluding a region (fixed region 1S) where the actuator 3 is bonded to the slider 1 with adhesive 4. In the first embodiment, where the slider 1 is bonded by coating projected portions 31a1 and 31b1 of the arms 31a and 31b with the adhesive 4, the free region dimension FL becomes the length other than the projected portions 31a1 and 31b1 of the arms 31a and 31b.

In order to secure accurate position adjustment of the slider 1, the free region dimension FL may be as long as possible. The longer free region dimension FL can increase the moving distance of the slider 1, thereby increasing the degree of position adjustment.

As shown in FIG. 3, the shape of the side surfaces of the adhered portions 2a and 2b is trapezoidal, and the length L2 of upper edges 2a3 and 2b3 of the adhered portions 2a and 2b is longer than the length L4 of lower edges 2a4 and 2b4.

The length L2 of the adhered portions 2a and 2b becomes a dimension obtained by subtracting a dimension L3 of a region other than the adhered portions 2a and 2b from the total length L of the slider 1. If the lengths L2 and L4 of the adhered portions 2a and 2b become excessively small, the amount of the adhesive 4 filled into the adhered portions 2a and 2b is decreased, and the adhesive force of the slider 1 to the arms 31a and 31b is decreased. As a result, during the movement of the arms 31a and 31b, the slider 1 may slip out of the arms 31a and 31b. Therefore, the lengths L2 and L4 are lengths having a sufficient adhesive force that the slider 1 does not slip out of the arms 31a and 31b during the movement of the arms 31a and 31b.

As shown in FIG. 5, the adhesive 4 is filled into spaces 5a and 5b (hatched in the drawing) between the arms 31a and 31b and the adhered portions 2a and 2b. The width dimension W2 of the spaces 5a and 5b is in a range of 10 to 50 μm, and is preferably in a range of 20 μm. If the width dimension W2 is in this range, the bonding between the slider 1 and the arms 31a and 31b can be firmly performed and the adhesive 4 can be properly filled using capillary action. In the slider 1 according to the first embodiment, the adhered portions 2a and 2b are continuously formed toward the rear edge 1c of the slider 1 from the front edge 1b of the slider 1 to the inclined surfaces 2a1 and 2b1 as the rear end surfaces. Further, since the adhered portions 2a and 2b having the adhered portion width WS are provided over the entire thickness (Z1 direction) of the slider 1, the width of the spaces 5a and 5b becomes W2. As a result, the width of the spaces 5a and 5b becomes large by the adhered portion width WS as compared to a width W1 of the spaces 5a and 5b when the adhered portions 2a and 2b are not provided, and thus the spaces 5a and 5b can be made large. Therefore, the amount of the adhesive 4 filled into the spaces 5a and 5b can be increased to reliably perform the bonding. Further, the adhesive 4 can be prevented from overflowing to the lower surface 1d of the slider 1. As a result, the magnetic head can be prevented from slipping out of a desired recording track position due to an excessive increase in the floating distance of the slider 1 caused by the overflow of the adhesive 4 to the lower surface 1d, and the surface of a magnetic recording medium can be prevented from being damaged due to an excessive decrease in the floating distance.

Further, since the adhered portions 2a and 2b are continuously formed toward the rear edge 1c of the slider 1 from the front end 1b of the slider 1 to the inclined surfaces 2a1 and 2b1 as the rear end surfaces, the adhesive 4 can be positively filled into the spaces 5a and 5b by capillary action.

Further, since the inclined surfaces 2a1 and 2b1 have the angle θk which is formed with respect to the horizontal plane, and the upper edges 2a3 and 2b3 of the adhered portions 2a and 2b which are located on the opposite surface to the ABS surface are formed to be longer than the lower edges 2a4 and 2b4, when the adhesive 4 overflows, it easily flows to the surface opposite from the ABS surface, but it hardly flows to the ABS surface.

Figure 6:
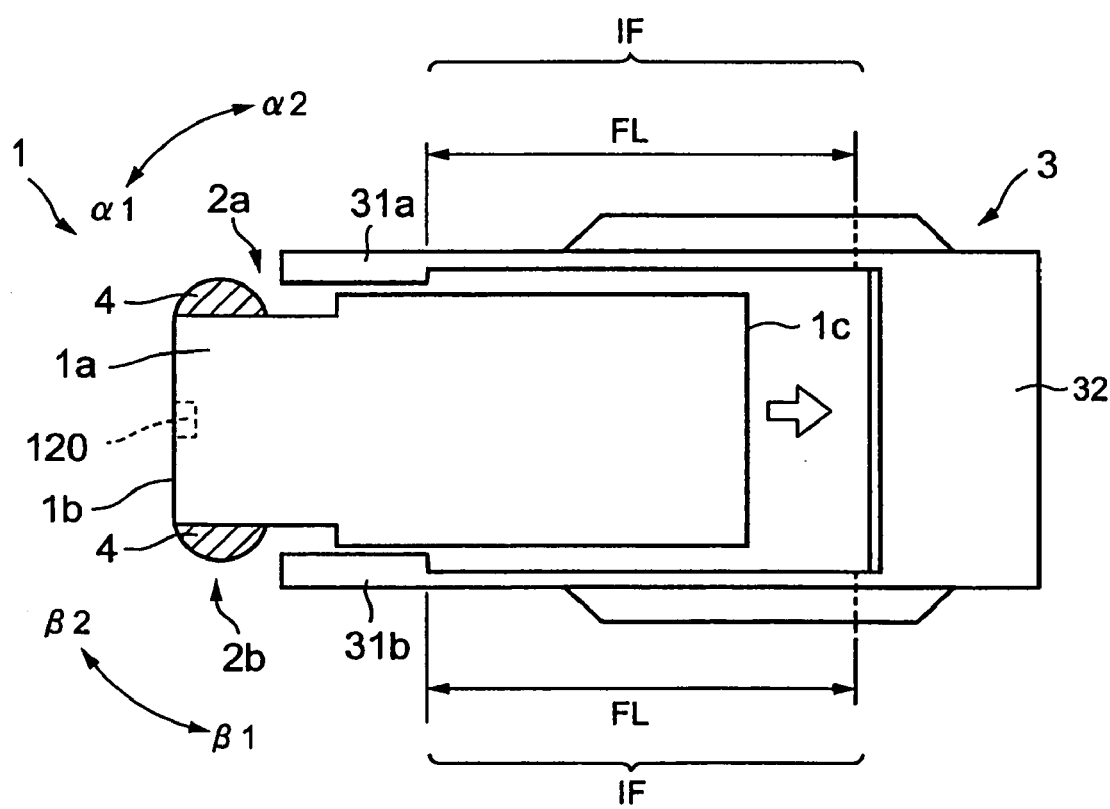
FIG. 6 shows the operation in which the slider according to the first embodiment when it is adhered to the micro actuator.
Figure 7:
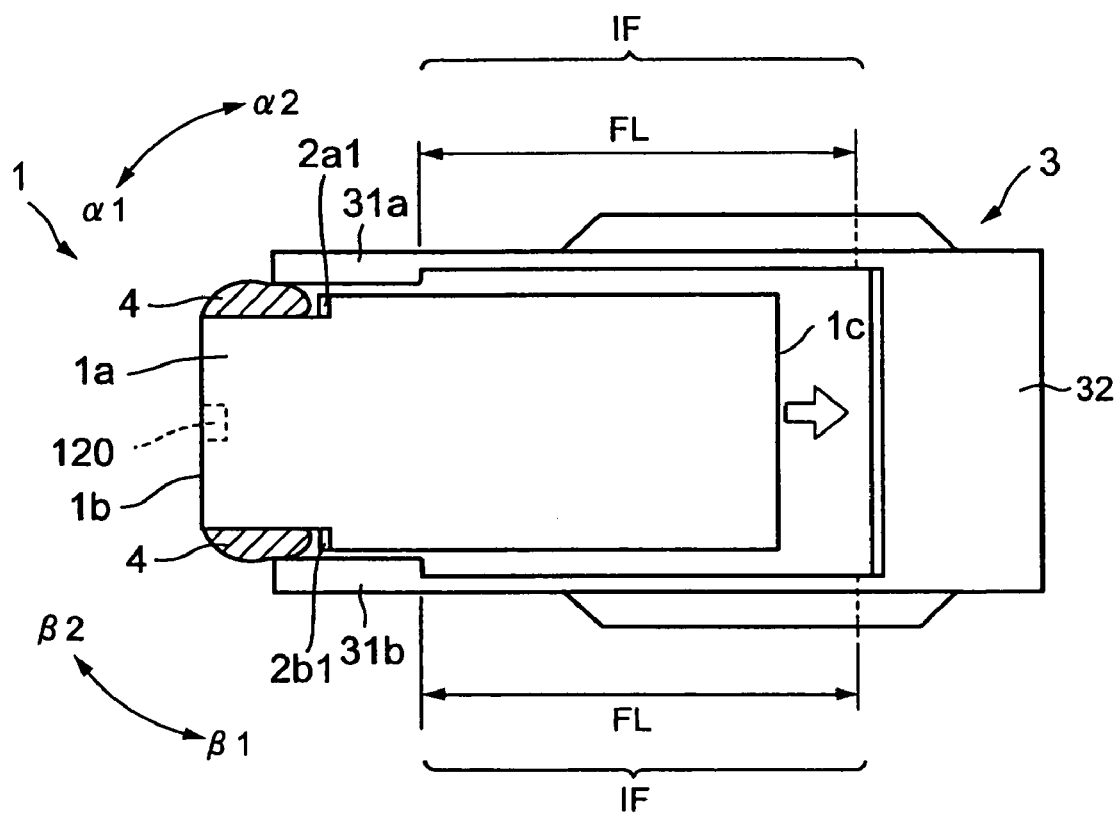
FIG. 7 shows the operation of the slider according to the first embodiment when it is adhered to the micro actuator.
Figure 7:
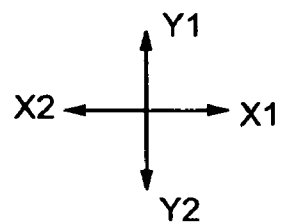

Further, when the slider 1 is adhered to the micro actuator 3, as shown in FIG. 6, only the tips of the adhered portions 2a and 2b in the X2 direction may be coated with the adhesive 4. Thereafter, when the slider is moved in the X1 direction, and as shown in FIG. 7 the adhesive 4 comes in contact with the arms 31a and 31b, the adhesive 4 enters the actuator gradually in the Xl direction. Here, the adhered portions 2a and 2b have the inclined surfaces 2a and 2b, whose width is equal to the adhered portion width WS on the side of the base 32 of the micro actuator 32 over the entire thickness of the slider 1. For the adhesive 4 to go beyond the side edges of the inclined surfaces 2a and 2b and flow to the free region 1F of the arms 31a and 31b requires a large energy. Therefore, rear end surfaces 4a and 4b of the adhesive 4 is dammed by the inclined surfaces 2a1 and 2b1, and as shown in FIG. 5, the rear end surfaces 4a and 4b abut the inclined surfaces 2a1 and 2b1 and stop while covering the inclined surfaces 2a1 and 2b1. That is, as shown in FIG. 5, the rear end surfaces 4a and 4b of the adhesive 4 in the lengthwise direction (X1-X2 direction) are formed at the same positions as the inclined surfaces 2a1 and 2b1 in the lengthwise direction (X1-X2 direction). In this way, the adhesive 4 can be stopped by the inclined surfaces 2a1 and 2b1 formed within the spaces 5a and 5b, to prevent the overflow of the adhesive 4 to the free region 1F. Accordingly, the lengths SL of the fixed region 18 can be easily arranged to a predetermined dimension with little variability thereof. As a result, it is possible to provide a magnetic head device 100 that has little variability in the free region dimension FL and guarantees the free region dimension FL, and to secure a desired moving distance of the slider 1.

The angle θk formed between the inclined surfaces 2a1 and 2b1 and the horizontal plane is not limited to an acute angle, and may be an obtuse angle.

Figure 8:
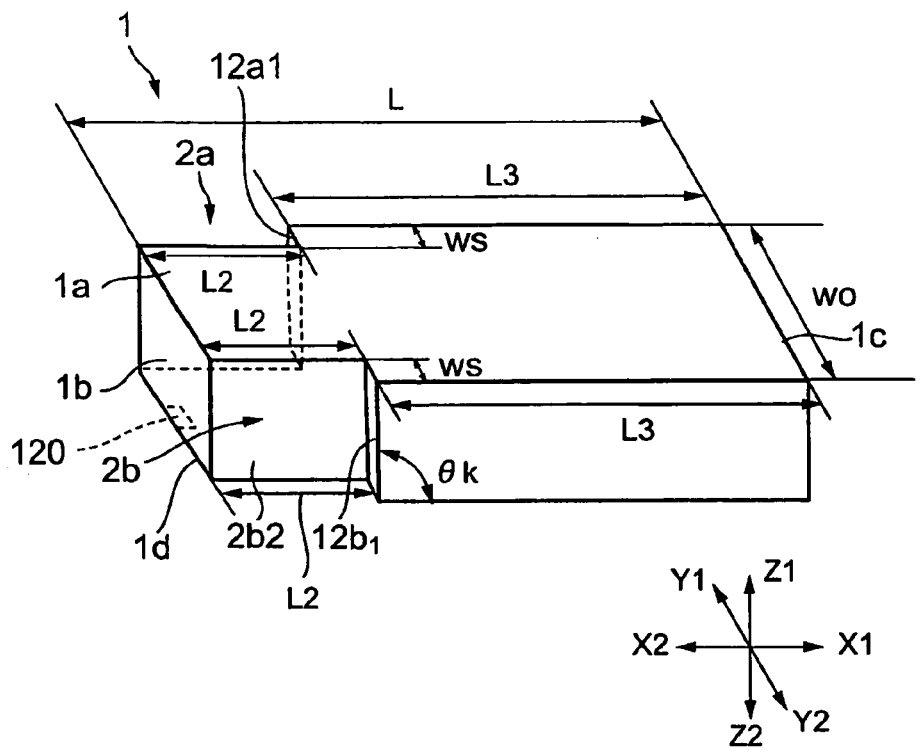
FIG. 8 is a perspective view showing a slider according to a modification of the first embodiment.

In addition, the slider 1 according to the first embodiment shown in FIG. 3 is constructed such that the rear end surfaces of the adhered portions 2a and 2b are inclined surfaces 2a1 and 2b1. However, as shown in FIG. 8, the rear end surfaces of the adhered portions 2a and 2b may be vertical surfaces 12a1 and 12b1 constructed in the slider 1 in its thickness direction (Z direction).

Figure 9:
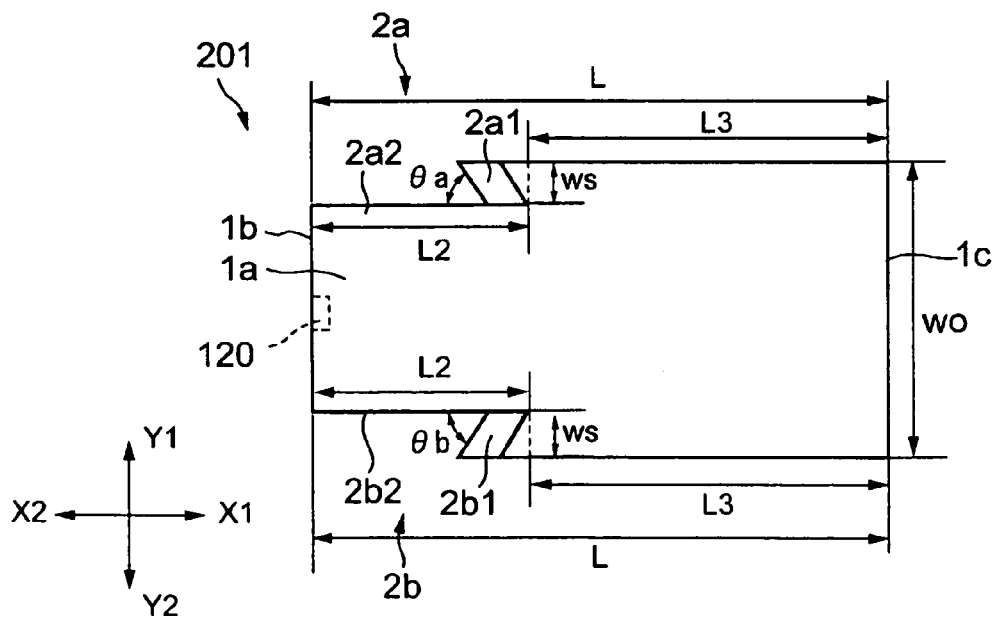
FIG. 9 is a plan view showing a slider according to a second embodiment.
Figure 10:
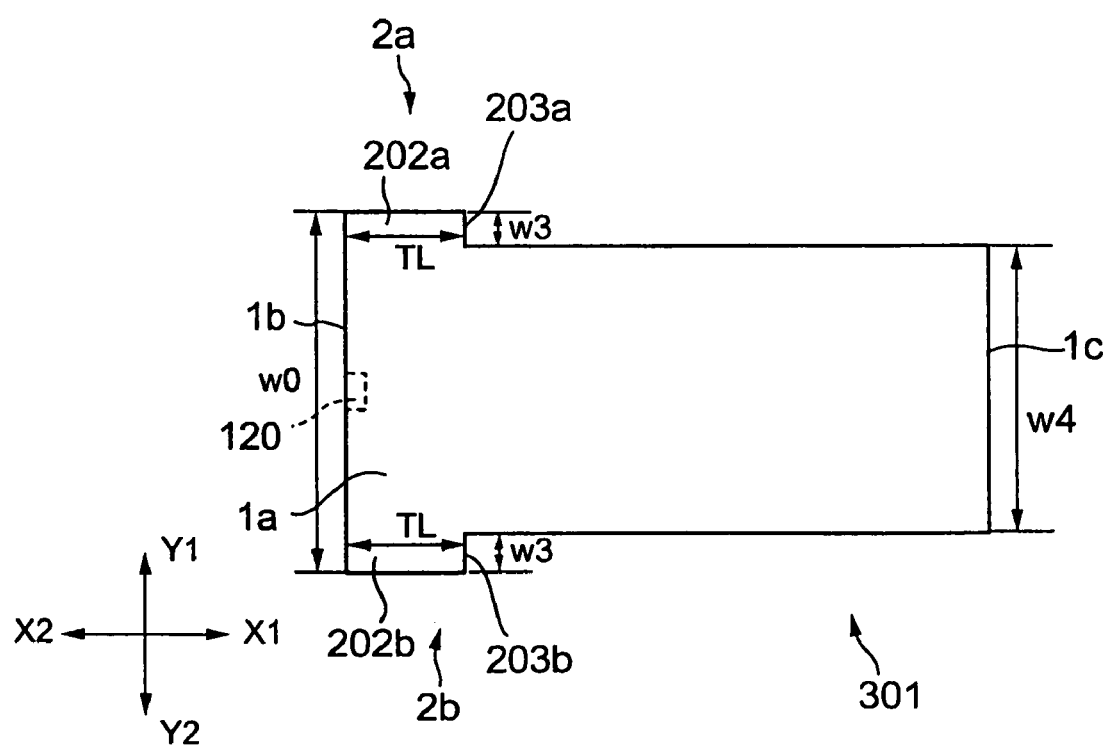
FIG. 10 is a plan view showing a slider according to a third embodiment.

FIG. 9 is a plan view showing a slider according to a second embodiment, and FIG. 10 is a plan view showing a slider according to a third embodiment.

A slider 201 according to the second embodiment shown in FIG. 9 has the same basic structure as the slider 1 according to the first embodiment of the present invention shown in FIG. 3 and FIG. 4. However, the slider 201 differs from the slider 1 according to the first embodiment in that the inclined surfaces 2a1 and 2b1 are provided such that inclined surface angles θa and θb between the inclined surfaces 2a1 and 2b1 and the adhered surfaces 2a2 and 2b2 become an acute angle, and the overflow of the adhesive 4 to the free region 1F may be prevented.

A slider 301 according to the third embodiment shown in FIG. 10 has the same basic structure as the slider 1. However, the slider 301 differs from the slider 1 according to the first embodiment in that the adhered portions 2a and 2b are formed to extend from the rear edge 1c of the slider 1 toward the front edge 1b and have front end surfaces 203a and 203b, The adhered portions 2a and 2b have projected portions 202a and 202b, respectively, the projected width of which is W3 and the projected portion dimension of which is TL. In the slider 301, a width W4 of a portion excluding the projected portions 202a and 202b is smaller than the total width WO of the slider 1 by twice the width W3 of the lateral projected portions 202a and 202b. The projected portion dimension TL may be in a range of, for example, 200 to 400 μm.

Figure 11:
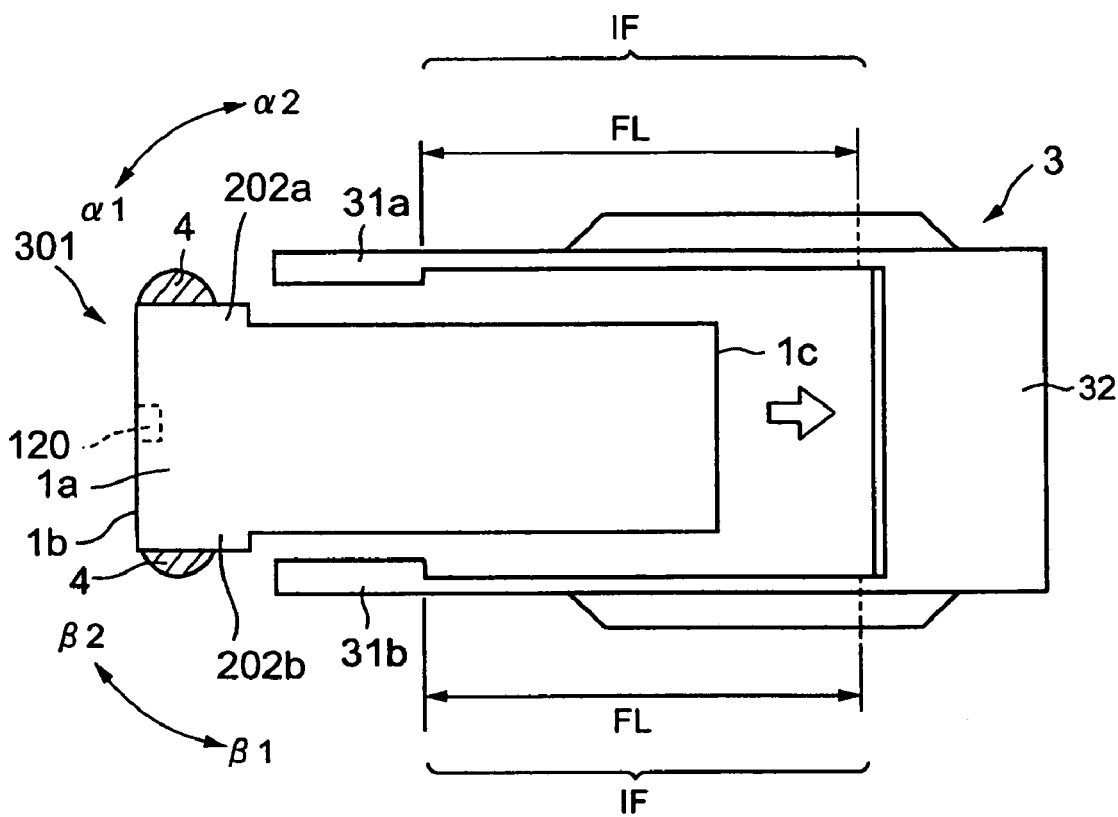
FIG. 11 shows the operation of the slider according to the third embodiment when the slider is adhered to the micro actuator.
Figure 11:
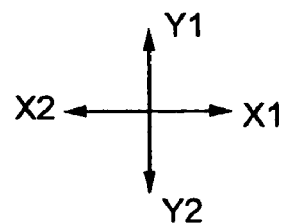
Figure 12:
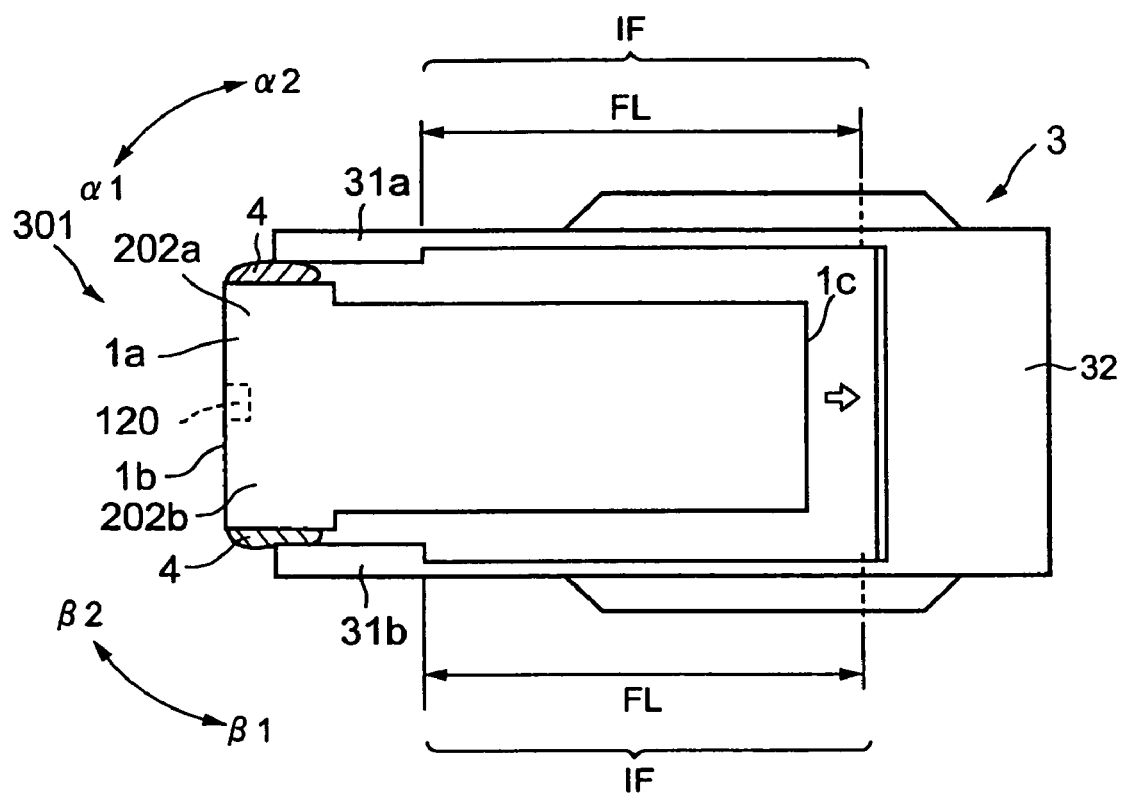
FIG. 12 shows the operation of the slider according to the third embodiment when the slider is adhered to the micro actuator.

When the slider 301 is adhered to the micro actuator 3, as shown in FIG. 11, only the tips of the projected portions 202a and 202b in the X2 direction are first coated with the adhesive 4. Thereafter, as shown in FIG. 11, when the adhesive 4 comes in contact with the arms 31a and 31b, the adhesive 4 enters the actuator gradually in the X1-direction as shown in FIG. 12.

Figure 13:
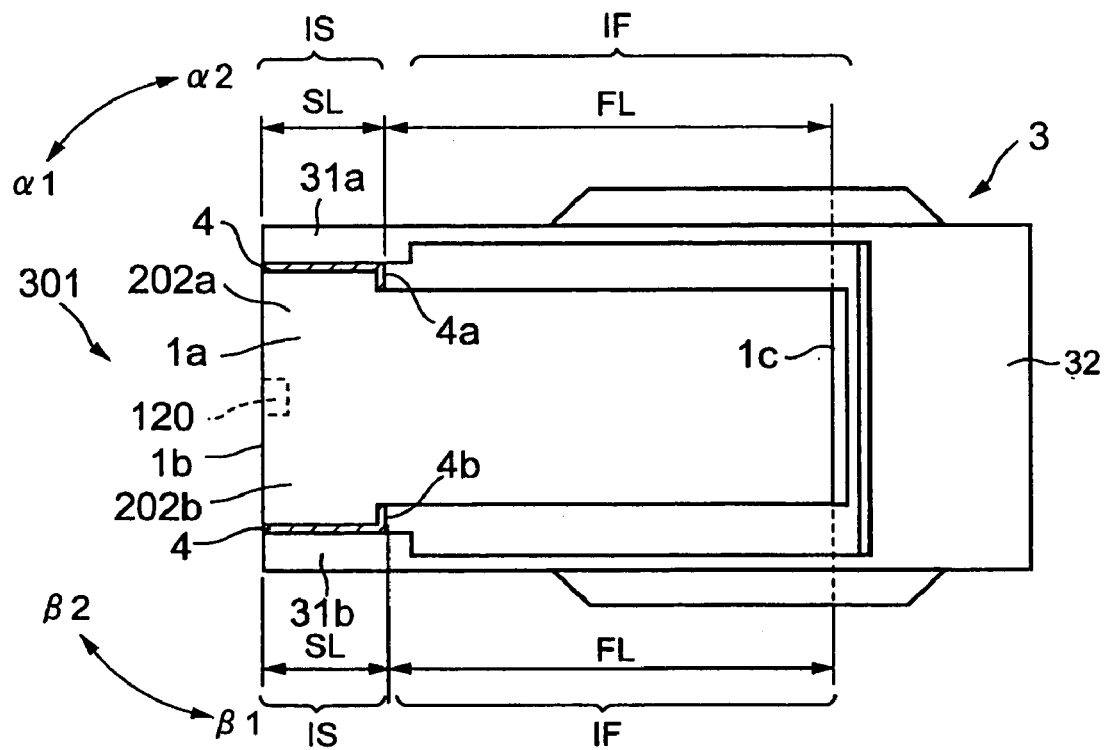
FIG. 13 shows a state in which the slider according to the third embodiment is bonded to the micro actuator.

In the slider 301, the width W4 of a portion excluding the projected portions 202a and 202b is smaller than the total width W0 of the slider 1 by twice the width W3 of the lateral projected portions 202a and 202b. Therefore, the adhesive 4, which has entered the actuator in the X1-direction, is spread on the front end surfaces 203a and 203b of the projected portions 202a and 202b by the projected width W3 to lower the surface tension of the adhesive 4. As a result, as shown in FIG. 13, the entrance of the adhesive 4 into the actuator in the X1 direction can be stopped in a state of covering the front end surfaces 203a and 203b, thereby better preventing the overflow of the adhesive 4 to the free region 1F. Accordingly, the lengths SL of the fixed region 1S of the arms 31a and 31b shown in FIG. 13 can be easily arranged to have a predetermined dimension with little variability thereof, and the overflow of the adhesive 4 to the free region 1F can be better prevented. As a result, it is possible to provide the magnetic head device 100 which has little irregularity in the free region dimension FL, and to results in the moving distance of the slider 1.

As described above, portions of recessed portions provided in the slider where the end surfaces of the recessed portions are provided are preferably angled without being rounded. If the above portions are angled, the flow of an adhesive to the free region 1F requires a large energy. Therefore, the overflow of the adhesive 4 to the free region 1F can be more positively prevented.

A method of manufacturing the slider 1 according to the present invention will be described.

Figure 14:
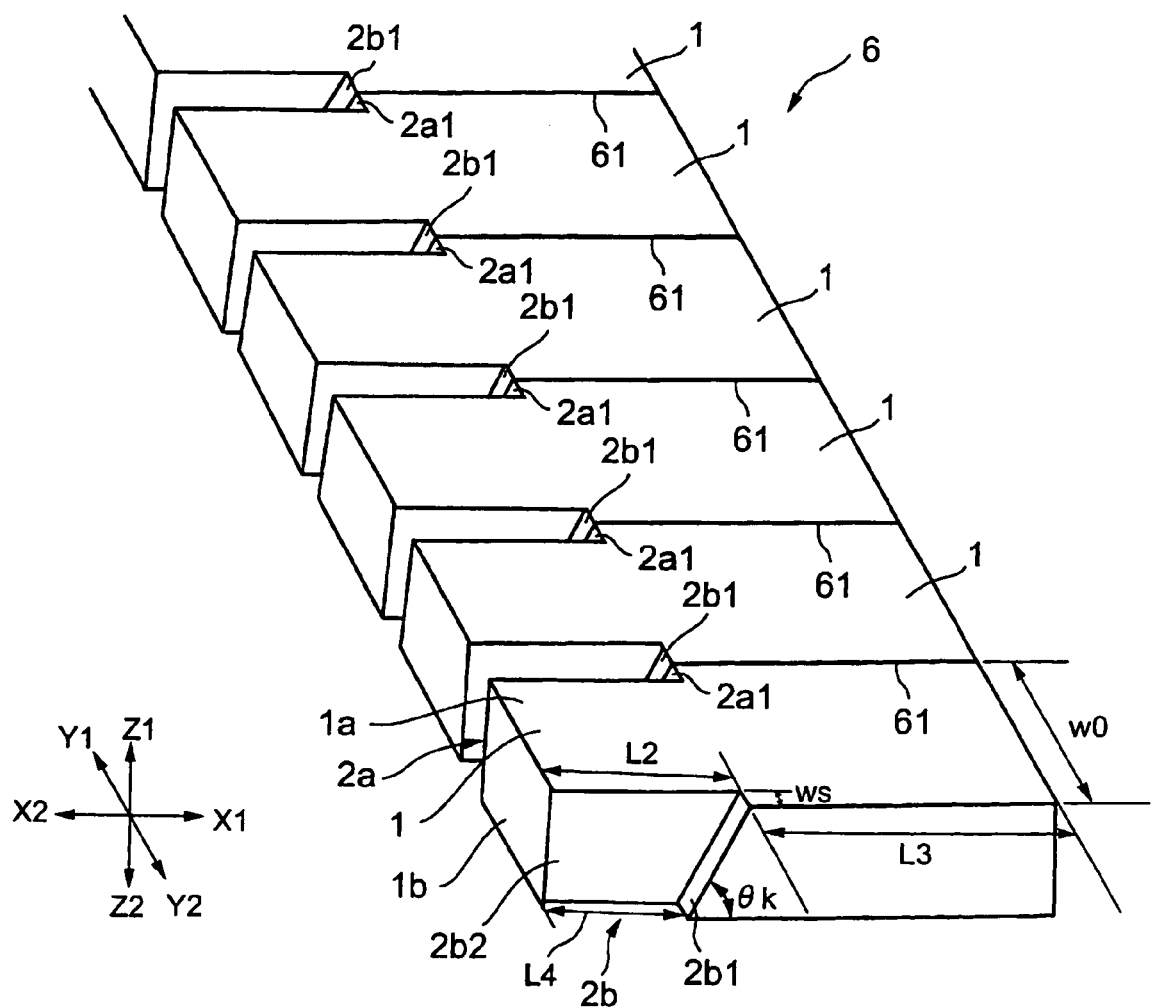
FIG. 14 is a perspective view showing a manufacturing process of the slider according to the first embodiment.

FIG. 14 is a perspective view showing a manufacturing process of the slider corresponding to the first embodiment.

First, in a state of a slider bar 6 made of a slider material, the slider bar 6 is shaved off in the X1 direction from the front edge 1b by using a dicing blade, or similar technique to form a plurality of the adhered portions 2a and 2b through continuous cutting, in which the adhered portions have the predetermined adhered portion width WS and the dimension L2 and have the inclined surfaces 2a1 and 2b2 having the predetermined angle θk and the inclined surface width L2. Next, the slider bar 6 is cut into individual sliders 1 along cutting lines 61 by using a cutting wheel, or similar technique as is known in the art.

Since the individual sliders 1 are formed with the adhered portions 2a and 2b in a state of the slider bar 6, it is possible to manufacture a great number of the sliders 1 in a short time at a higher manufacturing efficiency than a method by which the slider bar 6 is cut into slider blocks before the adhered portions 2a and 2b have been formed, and the cut slider blocks are formed with adhered portions 2a and 2b one by one.

Although FIG. 14 shows only the sliders having an acute angle as the angle θk, individual sliders 14 having an obtuse angle can also be formed through the same processes as the sliders having an acute angle.

Further, similar to the above, in the case of the slider 1, as shown in FIG. 8, that is a modification of the first embodiment of the present invention, and the slider 201, as shown in FIG. 9, that is the second embodiment of the present invention, the slider bar 6 is shaved off in the X1 direction from the front edge 1b in the state of slider bar 6 to form adhered portions 2a and 2b, and the slider bar 6 is then cut to form several sliders 1 or 201.

In the case of the slider 301, as shown in FIG. 10, according to the third embodiment, the slider bar 6 is shaved off in the X2 direction from the rear edge 1c in the state of the slider bar 6 to form projected portions 202a and 202b, and the slider bar 6 is then cut to form individual sliders 301.

The adhered portions 2a and 2b and the projected portions 202a and 202b may be formed using a dicing blade or the like. The dicing blade is a blade in which, as a disk provided with a cutting part rotates, the cutting part rotates with the disc to cut an object. Therefore, the shape of the inclined surfaces 2a1 and 2b1 or vertical surfaces 12a1 and 12b1 of the slider 1 or the shape of the inclined surfaces 2a1 and 2b1 of the slider 201 may have a substantially circular-arc curved surface which becomes a projected shape as it approaches the rear end 1c of the slider 1 or 201.

Although the present invention has been explained by way of the examples described above, it should be understood to the ordinary skilled person in the art that the invention is not limited to the examples, but rather that various changes or modifications thereof are possible without departing from the spirit of the invention. Accordingly, the scope of the invention shall be determined only by the appended claims and their equivalents.

What is claimed is:

1. A magnetic head device comprising:
a slider including at least one of a reproducing element which detects a signal recorded on a recording medium and a recording element which records a magnetic signal on the recording medium, the at least one element being exposed on a surface of the slider facing the recording medium; and
an actuator for moving the slider, wherein side surfaces of the slider have recessed portions formed from a front edge of the slider for a predetermined distance toward a rear edge of the slider and extending from a top surface to a bottom surface thereof;
wherein the actuator has a base with a predetermined length and deformable arms extending from the base, wherein the arms and the recessed portions are bonded together with an adhesive.

2. The magnetic head device according to claim 1 wherein end surfaces of the recessed portions are formed with inclined surfaces having an angle with respect to a horizontal plane, and length of edges of the recessed portions, located on the recording medium facing side are shorter than lengths of edges of the recessed portions located on the opposite side to the recording medium facing side.

3. The magnetic head device according to claim 1, wherein the arms are formed with deformable free regions, and with fixed regions which are bonded to the slider by the bonding means.

4. The magnetic head device according to claim 1, wherein side surfaces of the arms are formed with piezoelectric structures having piezoelectric elements, and the arms are deformed by deformation of the piezoelectric structures.

5. A magnetic head device comprising:
a slider including at least one of a reproducing element which detects a signal recorded on a recording medium and a recording element which records a magnetic signal on the recording medium, the at least one element being provided on a side of the slider facing the recording medium, and
an actuator for moving the slider, wherein side surfaces of the slider have recessed portions formed from an upper surface of the slider to a lower surface thereof, and from a rear edge of the slider to an end surface,
wherein the actuator has a base having a predetermined length, and deformable arms extending from the base and located on sides of the side surfaces, and
wherein the arms and the actuator are bonded together with bonding means, and rear end surfaces of the bonding means are formed to cover end surfaces of the recessed portions;
wherein the arms are formed with deformable free regions, and with fixed regions which are bonded to the slider by the bonding means.

6. The magnetic head device according to claim 5, wherein the end surfaces of the recessed portions are formed with inclined surfaces having an angle with respect to a horizontal plane, and lengths of edges of the recessed portions located on the recording medium facing side are shorter than lengths of edges of the recessed portions located on an opposite side to the recording medium facing side.

7. The magnetic head device according to claim 5, wherein side surfaces of the arms are formed with piezoelectric structures having piezoelectric elements, and the arms are deformed by deformation of the piezoelectric structures.

8. A magnetic head device, comprising:
a slider, comprising at least one of a magnetic recording element and a magnetic reproducing element, the slider having a recessed portion formed on a side thereof and extending from a top surface to a bottom surface, and extending from one of a front edge and a rear edge for a predetermined distance toward the rear edge or the front edge, respectively;
an actuator, comprising a distal end, flexible elements extending from each side surface of the distal end and disposed such that the flexible elements are parallel and have facing projected surfaces at a proximal end, the flexible elements spaced so as to accommodate the slider; and
an adhesive layer disposed between the slider and the facing projected surface.

9. The magnetic head device according to claim 8, wherein side surfaces of the flexible elements comprise piezoelectric elements.

10. The magnetic head device according to claim 8, wherein end surfaces of the recessed portions are formed with inclined surfaces.

11. A method of manipulating a magnetic slider, the method comprising:
providing a slider, the slider having recesses on opposing sides, the recesses extending from a top surface of the slider to a bottom surface, and extending from one of a front edge and a rear edge for a predetermined distance toward the rear edge or the front edge, respectively;
providing an actuator having flexible arms attached at a distal end and spaced apart so as to accommodate the slider at a proximal end;
adhering the slider at the front edge between the proximal end of the flexible arms; and
controlling the actuator.

12. A method of manufacturing a slider, the method comprising:
providing a slider bar having a plurality of magnetic elements disposed thereon;
forming a plurality of grooves extending from a top surface to a bottom surface of the slider bar, each groove disposed perpendicular to a long axis of the slider bar and between adjacent magnetic elements, each groove having an inclined or vertical surface with respect to a horizontal plane a positioned a predetermined distance from an edge including the magnetic elements; and
separating the plurality of magnetic elements by cutting along a plane centered in and parallel to the groove.

13. A method of manufacturing a magnetic head, the method comprising:
provides a slider having a recess in opposing sides thereof, the recess extending to one of a front edge and a rear edge from an inclined or vertical surface with respect to a horizontal plane and positioned a predetermined distance from the one of the front edge or a rear edge;
providing an actuator having flexible, arms spaced so as to accommodate the slider there between; and
adhering the slider near the front edge thereof to the actuator by disposing an adhesive between the slider and an opposing surface of the flexible arm.

14. The method of claim 13, wherein a piezoelectric element is formed on each of the flexible arms.

15. A method of adjusting a position of a sensing element, the method comprising:
providing a sensing element, the sensing element having a recess in opposing sides thereof and extending to one of the front edge or the rear edge from an inclined or vertical surface with respect to a horizontal plane and positioned a predetermined distance from the one of the front edge or a rear edge;
providing an actuator, the actuator having flexible arms spaced apart to accommodate the sensing element there between, the slider adhered to the actuator by an adhesive disposed between the slider and the flexible arm; and
applying a voltage to one or more piezoelectric elements disposed on the flexible arms.

16. A magnetic head, comprising:
a slider having a recess formed in opposing sides between a top surface and a bottom surface and extending to one of a front edge or a rear edge from an inclined or vertical surface with respect to a horizontal plane and positioned a predetermined distance from the one of the front edge or a rear edge;
a means for actuating the slider; and
a means for adhering the actuating means to the slider near the front edge of the slider.

17. The magnetic head of claim 16, wherein the adhering means is an adhesive disposed between the actuating means and the slider.

18. The magnetic head of claim 17, wherein the adhesive is an epoxy resin.

19. A magnetic element, comprising:
a slider having at least one of a magnetic reproducing element that detects a signal recorded on a recording medium and a magnetic recording element that records a magnetic signal on the recording medium: the at least one element being provided on a side of the slider facing the recording medium, the slider having a recess in opposing sides thereof, the recess extending to one of a front edge or a rear edge from an end surface located a predetermined distance from the one of the front edge or the rear edge, respectively;
wherein the end surfaces of the recessed portions are formed with inclined surfaces having an angle with respect to a horizontal plane, and length of edges of the recessed portions located on the recording medium facing side are shorter than lengths of edges of the recessed portions located on an opposite side to the recording medium facing side.

* * * * *